United States Patent
Kull et al.

(10) Patent No.: US 9,206,873 B2
(45) Date of Patent: Dec. 8, 2015

(54) LOCKABLE GAS SPRING ARRANGEMENT

(75) Inventors: James Kull, Denver, NC (US); Patrick Hartman, Gastonia, NC (US)

(73) Assignee: Stabilus GmbH, Koblenz (DE)

( * ) Notice: Subject to any disclaimer, the term of this patent is extended or adjusted under 35 U.S.C. 154(b) by 441 days.

(21) Appl. No.: 13/354,922

(22) Filed: Jan. 20, 2012

(65) Prior Publication Data

US 2013/0187315 A1    Jul. 25, 2013

(51) Int. Cl.
   *F16F 5/00* (2006.01)
   *F16F 9/02* (2006.01)

(52) U.S. Cl.
   CPC .................... *F16F 9/0254* (2013.01)

(58) Field of Classification Search
   CPC ..................................... F16F 9/0254
   USPC ............................... 267/64.12, 120
   See application file for complete search history.

(56) References Cited

U.S. PATENT DOCUMENTS

| | | | |
|---|---|---|---|
| 3,758,092 A * | 9/1973 | McGregor | 267/131 |
| 4,565,404 A * | 1/1986 | Rauschenberger | 297/19 |
| 4,807,855 A | 2/1989 | Schuitema | |
| 5,529,148 A * | 6/1996 | O'Leary | 188/67 |
| 5,975,228 A * | 11/1999 | Parfitt | 180/69.21 |
| 6,050,209 A * | 4/2000 | Vincent et al. | 114/98 |
| 7,654,371 B1 * | 2/2010 | Metz et al. | 188/300 |
| 2004/0055839 A1 * | 3/2004 | Meret | 188/300 |
| 2004/0113341 A1 * | 6/2004 | McConnell et al. | 267/195 |

* cited by examiner

*Primary Examiner* — Robert A Siconolfi
*Assistant Examiner* — Mahbubur Rashid
(74) *Attorney, Agent, or Firm* — Cozen O'Connor

(57) ABSTRACT

A lockable gas spring arrangement includes a gas spring with a closed cylinder, a displaceably guided piston and piston rod. A fastening tube fastened with its one end in the region of the free end of the piston rod and on which a locking element is arranged. The locking element is able to be moved substantially radially to the piston rod between an unlocked position permitting a free insertion movement and a locked position bearing against the front face of the cylinder on the piston rod side when the piston rod is extended. The locking element is able to be urged by a spring into its locked position. The locking element is able to be moved manually from its locked position into its unlocked position and is able to be retained automatically in its unlocked position by a retaining device.

18 Claims, 4 Drawing Sheets

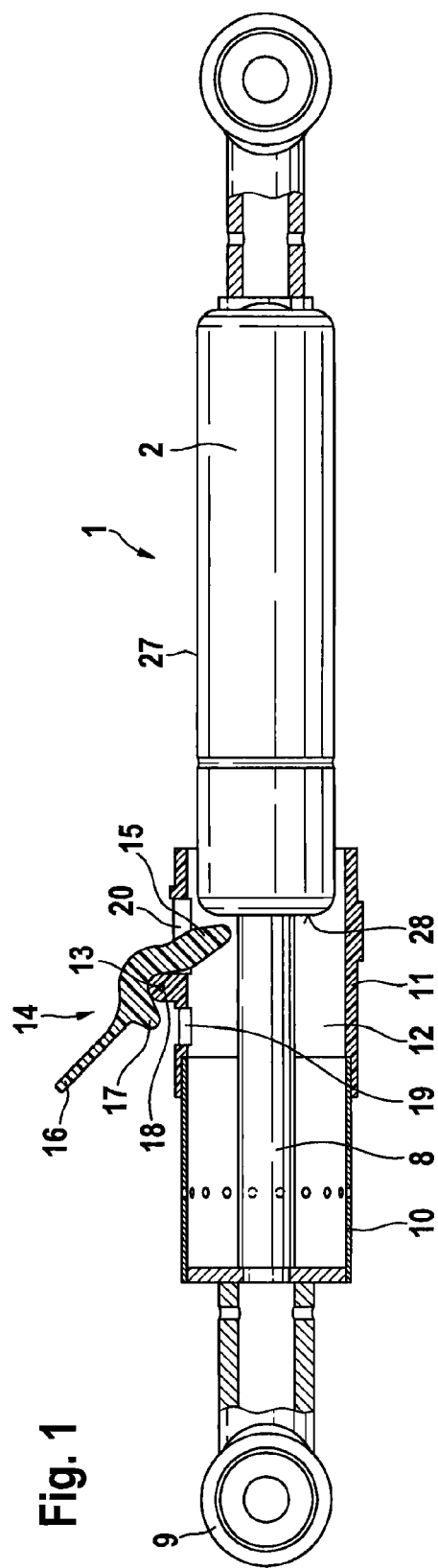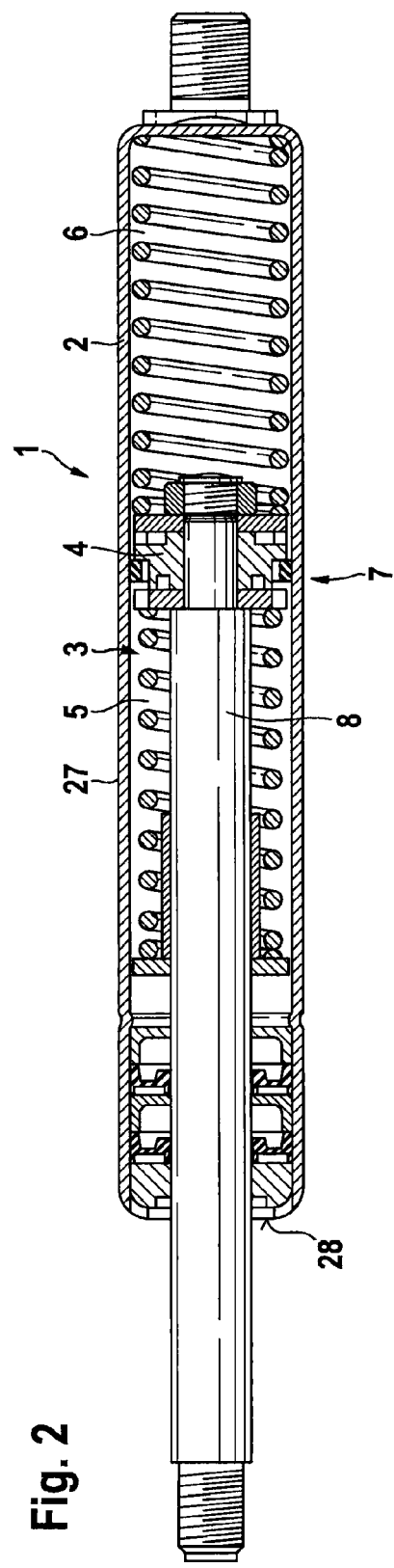

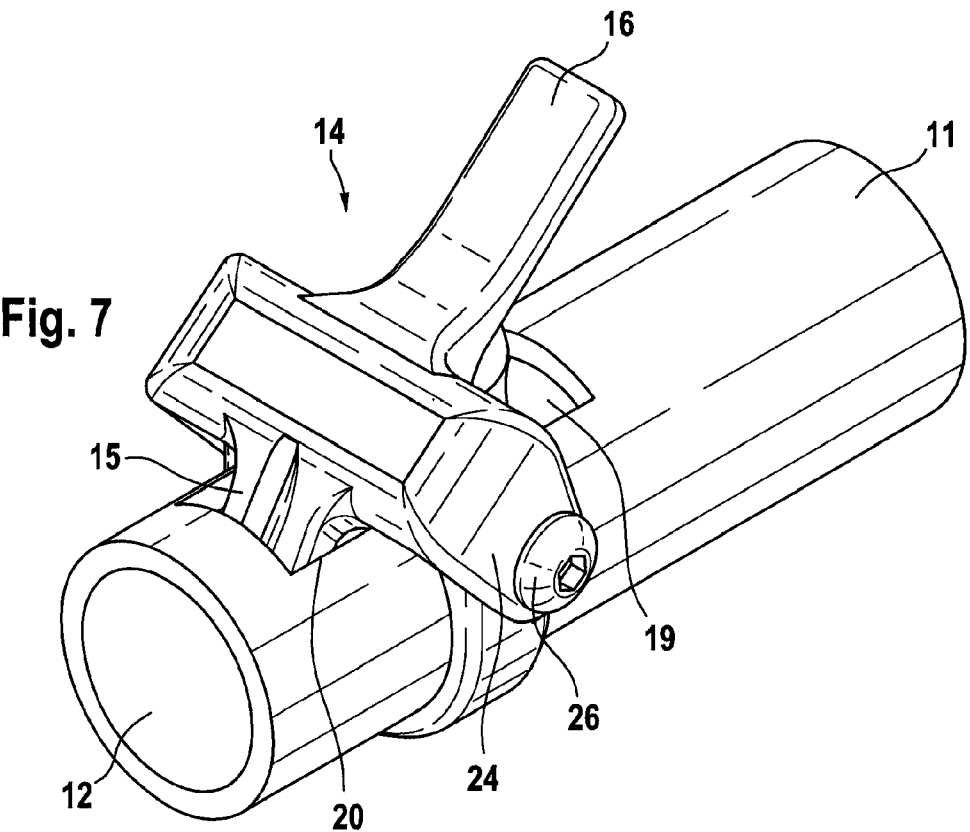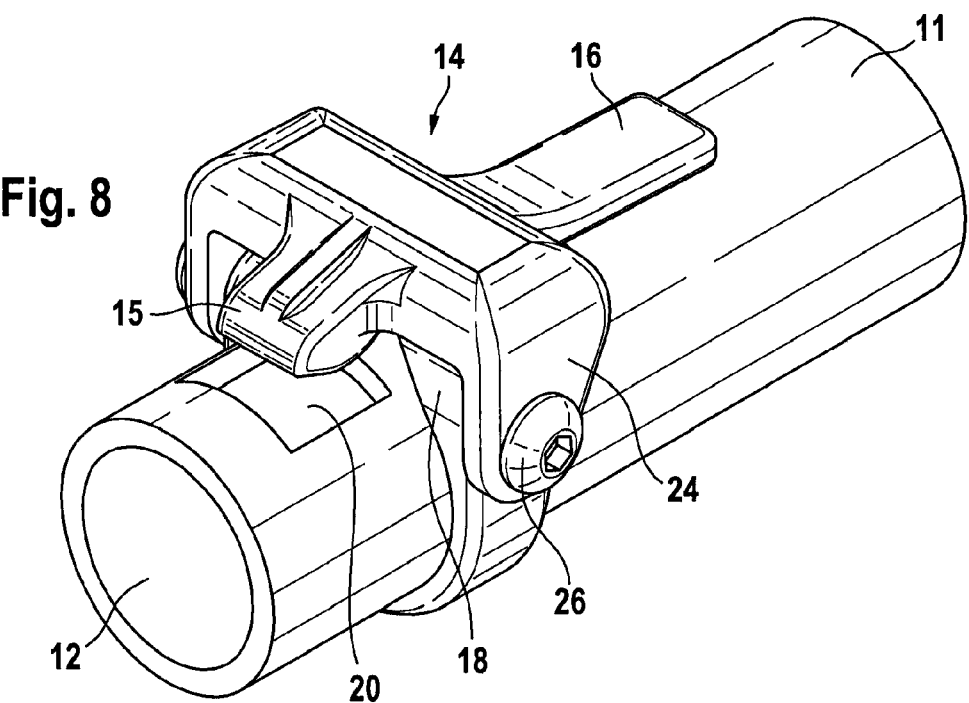

LOCKABLE GAS SPRING ARRANGEMENT

BACKGROUND OF THE INVENTION

1. Field of the Invention

The present invention relates to a lockable gas spring arrangement.

2. Description of the Related Art

In the past (U.S. Pat. No. 4,807,855), gas springs included a closed cylinder with a cylinder interior which is filled with compressed gas and which is subdivided into a first and a second chamber by a displaceably guided piston, which on one side has a piston rod which on one front face of the cylinder is guided outwardly in a sealed manner out of the cylinder interior. The first and second chambers are connected together or are able to be connected together. The arrangement includes a fastening tube with a larger internal diameter than the external diameter of the cylinder and has a length which is smaller than or the same as the maximum extension length of the piston rod and which is fastened with its one end in the region of the free end of the piston rod and on which a locking element is arranged. The locking element is able to be moved substantially radially to the piston rod between an unlocked position permitting a free insertion movement and a locked position bearing against the front face of the cylinder on the piston rod side when the piston rod is extended. The locking element is able to be urged by a spring into its locked position.

In such a known gas spring arrangement, a locking pin is displaceably guided radially on the locking cylinder and loaded by a pretensioned spring towards the piston rod.

When the piston rod is extended, the locking pin moves until it comes to bear against the piston rod, whereas when the piston rod is retracted the locking pin is moved until it comes to bear against the cylinder.

Such a gas spring is used, for example, for opening flaps or doors, in particular on motor vehicles, utility vehicles or agricultural vehicles and machines, wherein the flaps and doors are pivoted upwards, in particular about a horizontal axis, from a substantially downwardly oriented position for opening into a substantially horizontal position.

Gas springs with a large extension stroke of the piston rod are frequently required here.

In order to hold the flaps or doors securely in the open position, and to avoid inadvertent pivoting-back, the locking pin comes to bear against the front face of the cylinder on the piston rod side and thus prevents the retraction of the piston rod. Only when the locking pin is pulled outwards manually counter to the force of the pretensioned spring in a radial manner, and thus moved out of the region of the front face of the cylinder, can the flap or door be moved in manually counter to the extension force of the gas spring in the cylinder.

In particular, with large flaps and doors, the extension force of the gas spring is high and requires both hands to grip the flap in order to be able to move said flap into its closed position.

This is, however, not possible in the known gas spring arrangement, as one hand is required for pulling the locking pin.

It is, therefore, an object of the invention to provide a lockable gas spring arrangement of the aforementioned type which permits a simple and comfortable operation for retracting the gas spring.

SUMMARY OF THE INVENTION

This object is achieved according to the present invention by providing the locking element which is able to be moved manually from its locked position into its unlocked position and which is able to be retained automatically in its unlocked position by a retaining device.

In this embodiment, initially only the locking element is able to be moved into its unlocked position for the retraction process. The locking element remains in this position automatically and does not have to be manually retained, so that the operator has both hands free in order to retract the gas spring.

If, moreover, when the piston rod is pushed in and the locking element is located in the radial region of the cylinder, the retaining function of the retaining device is able to be released automatically, the locking element comes to bear against the peripheral surface of the cylinder with resilient pretension. As soon as the gas spring is extended again and the locking element passes through the region of the front face of the cylinder, the locking element is automatically moved into its locked position and prevents an inadvertent retraction of the piston rod.

If, for example, a flap or a door of a motor vehicle, a utility vehicle or an agricultural device or a machine is raised by means of the gas spring from a downwardly oriented, approximately vertical closed position into an approximately horizontal open position, the flap or door is secured in the open position by means of the locking element.

In particular, with large, heavy flaps or doors which require a large extension force of the gas spring, after the locking element moves into its unlocked position the operator has both hands free in order to move the flap or door again into the closed position counter to the force of the gas spring.

If the retaining function of the retaining device is automatically released, during a subsequent opening process of the flap or door, the locking element is automatically moved into its locked position again.

In a simple embodiment, the locking element may comprise a locking arm which is pivotably mounted about a locking axis between its unlocked position extending approximately parallel to the piston rod and a locked position extending at an angle, in particular approximately at right angles, to the piston rod.

If the locking element is of dual-arm configuration here, the one arm being the locking arm and the other arm being an actuating arm, the locking element is able to be moved manually and in a simple manner from its locked position into its unlocked position.

In this case, the actuating arm is able to extend approximately opposite the locking arm.

A dead center point may be present on the pivoting path of the locking element between the locked position and the unlocked position, wherein on the path between the dead center point and the unlocked position the locking element is urged in a movable manner by an unlocking spring into the unlocked position and, on the path between the dead center point and the locked position, by a locking spring into the locked position.

As a result, on the one hand, the locking element is automatically retained in its unlocked position. If the locking element is moved over the dead center point in the direction of the piston rod or the cylinder, it is ready to move again automatically into its locked position.

The unlocking spring and the locking spring may be formed by an over-center spring, to save on the number of components.

Only by retracting the piston rod is the locking element ready for automatically moving into the locked position, when the locking element comprises an unlocking arm which in the unlocked position of the locking element protrudes approximately radially into the interior of the fastening tube towards the piston rod protruding out of the cylinder and which, when the piston rod is retracted, may be pivoted away from the front face of the cylinder on the piston rod side, out of the internal region of the fastening tube, wherein the retaining function of the retaining device is able to be released.

If the locking axis extends radially outside the fastening tube, transversely to the longitudinal extent of the piston rod, the entire locking mechanism is located outside the fastening tube so that the internal diameter thereof only has to be slighter larger than the external diameter of the cylinder to save on constructional space.

If the locking element is pivotably mounted on a locking tube about the locking axis, wherein the locking tube is fastened coaxially to the fastening tube on the end thereof facing the cylinder, said components may be produced as separate sub-assemblies simplifying the production.

The production is also simplified if the locking tube and/or the locking element is a plastics injection-moulded part, wherein the locking axis is advantageously borne on a bearing block which is formed integrally with the fastening tube.

For fastening the locking tube to the fastening tube, the locking tube at its end region remote from the cylinder may have an internal diameter corresponding to the external diameter of the fastening tube, and may be fixedly arranged on the end region of the fastening tube facing the cylinder, enclosing said end region.

For easy fastening, the locking tube may be fixedly connected to the fastening tube by adhesive bonding, wherein during mounting the locking element is able to be aligned with a connecting element at the free end of the piston rod in a simple manner.

A high degree of stable support results when the fastening tube consists of a metal material.

The ability of the locking arm and/or the unlocking arm to pivot into the inside of the fastening tube or locking tube is achieved by the fastening tube or the locking tube comprising one or more radial through-passages, through which the locking arm and/or the unlocking arm may penetrate the inside of the fastening tube or the locking tube.

The spacing between the fastening region of the fastening tube on the piston rod and the locking element may correspond approximately to the maximum extension length or even less than the maximum extension length of the piston rod, wherein locking accordingly takes place at the maximum extension length or less than the maximum extension length of the piston rod. The extension length may, however, also be varied in that with a fixed arrangement of the locking element the fastening tube is able to be altered in length.

To prevent considerable damage by the piston rod being overloaded in the retraction direction, when the locking element is located in the locked position and exceeds a specific bearing force on the front face of the cylinder on the piston rod side, it is able to shear off.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

BRIEF DESCRIPTION OF THE DRAWINGS

An exemplary embodiment of the present invention is shown in the drawings and described in more detail hereinafter, in which:

FIG. 1 is a side view of a lockable gas spring arrangement partially in longitudinal section;

FIG. 2 is a longitudinal section of a gas spring of the gas spring arrangement according to FIG. 1;

FIG. 7 is a perspective view of the locking tube with the locking element according to FIG. 3 in the locked position; and FIG. 8 is a perspective view of the locking tube with the locking element according to FIG. 3 in the unlocked position.

DETAILED DESCRIPTION OF THE PRESENTLY PREFERRED EMBODIMENTS

Figure 3:
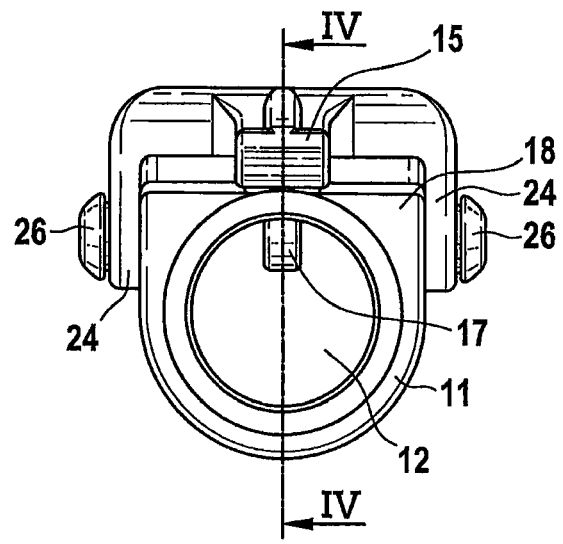
FIG. 3 is a front view of a locking tube with the locking element of the gas spring arrangement according to FIG. 1.

The lockable gas spring arrangement shown in the figures comprises a gas spring 1 which has a closed cylinder 2, the cylinder interior 3 thereof being filled with compressed gas. The cylinder interior 3 is subdivided by a piston 4 into a first chamber 5 and a second chamber 6.

The first chamber 5 and the second chamber 6 are connected together via a valve arrangement 7 in the piston 4.

The piston 4 comprises on one side a piston rod 8 which is guided coaxially through the first chamber 5 and in a manner which is sealed relative to the outside and has a connecting element 9 at its free end.

In the region of the connecting element 9, one end of a fastening tube 10 is fastened to the piston rod 4, said fastening tube extending coaxially relative to the cylinder 2.

A locking tube 11 also extending coaxially relative to the piston rod 4 is fastened to the end of the fastening tube 10 facing the cylinder 2.

To this end, the internal bore 12 of the end region of the locking tube 11 facing the fastening tube 10 is formed in a stepped manner with a greater internal diameter which corresponds to the external diameter of the fastening tube 10.

By means of this larger step the locking tube 11 is pushed sufficiently far onto the fastening tube 10 until the front face of the fastening tube 10 bears against the transition, which forms a shoulder, of the large step with the smaller internal diameter of the internal bore 12.

The locking tube 11 is fixedly connected to the fastening tube 10 by adhesive bonding.

The locking tube 11, which is formed as an injection-moulded part made of plastics, has a bearing block 18 protruding radially outwardly and injection-moulded thereon with a locking axis 13 extending transversely to the longitudinal extent of the fastening tube 10.

A locking element 14 made of plastics is pivotably mounted about the locking axis 13 between a locked position and an unlocked position.

The locking element 14 comprises a locking arm 15 and an actuating arm 16 extending diametrically relative to one another as well as an unlocking arm 17 approximately at right angles to the actuating arm 16.

A radial through-passage 19 and 20 is formed in the locking tube 11 axially on each side of the bearing block 18.

Figure 4:
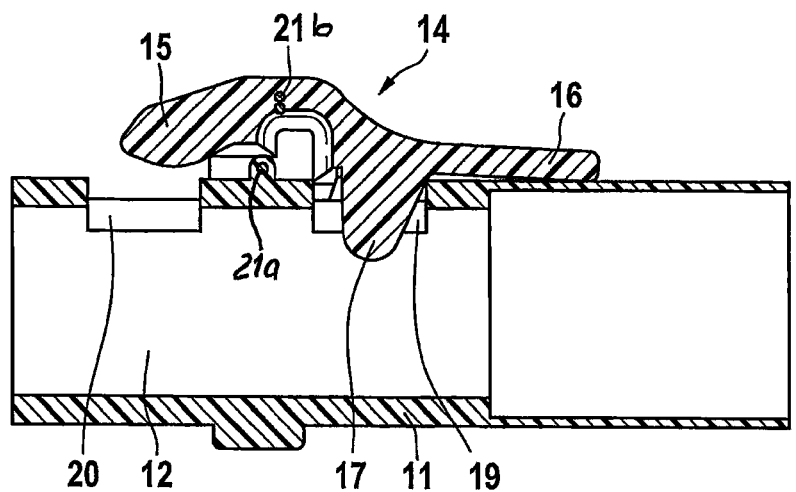
FIG. 4 is a longitudinal section along the line IV-IV in FIG. 3 of the locking tube with the locking element of the gas spring arrangement according to FIG. 1.
Figure 5:
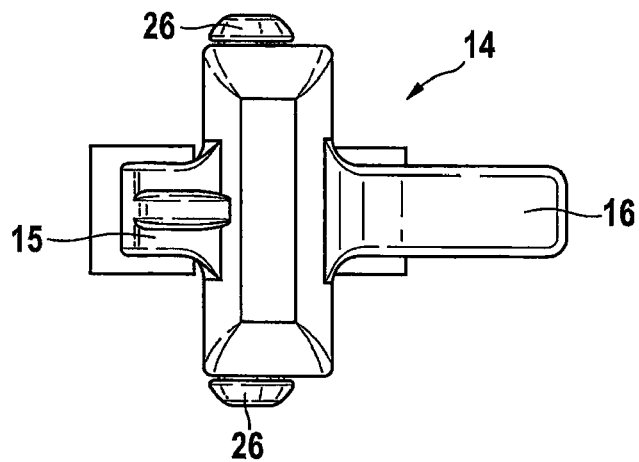
FIG. 5 is a plan view of the locking element according to FIG. 3.

When pivoting the locking element 14 from its unlocked position shown in FIGS. 4 and 8, with the locking arm 15 and the actuating arm 16 extending approximately parallel to the locking tube 11, into its locked position shown in FIGS. 1 and 7, the locking arm 15 penetrates the through-passage 20 into the inside of the locking tube 11.

At the same time, the unlocking arm 17 protruding in the unlocked position of the locking element 14 through the through-passage 19 into the inside of the locking tube 11, moves out of the inside of the locking tube 11.

The locking element 14 is preferably acted upon by an over-center spring 21 fastened to the bearing block 18, a dead center point being located on the spring path thereof.

Figure 6:
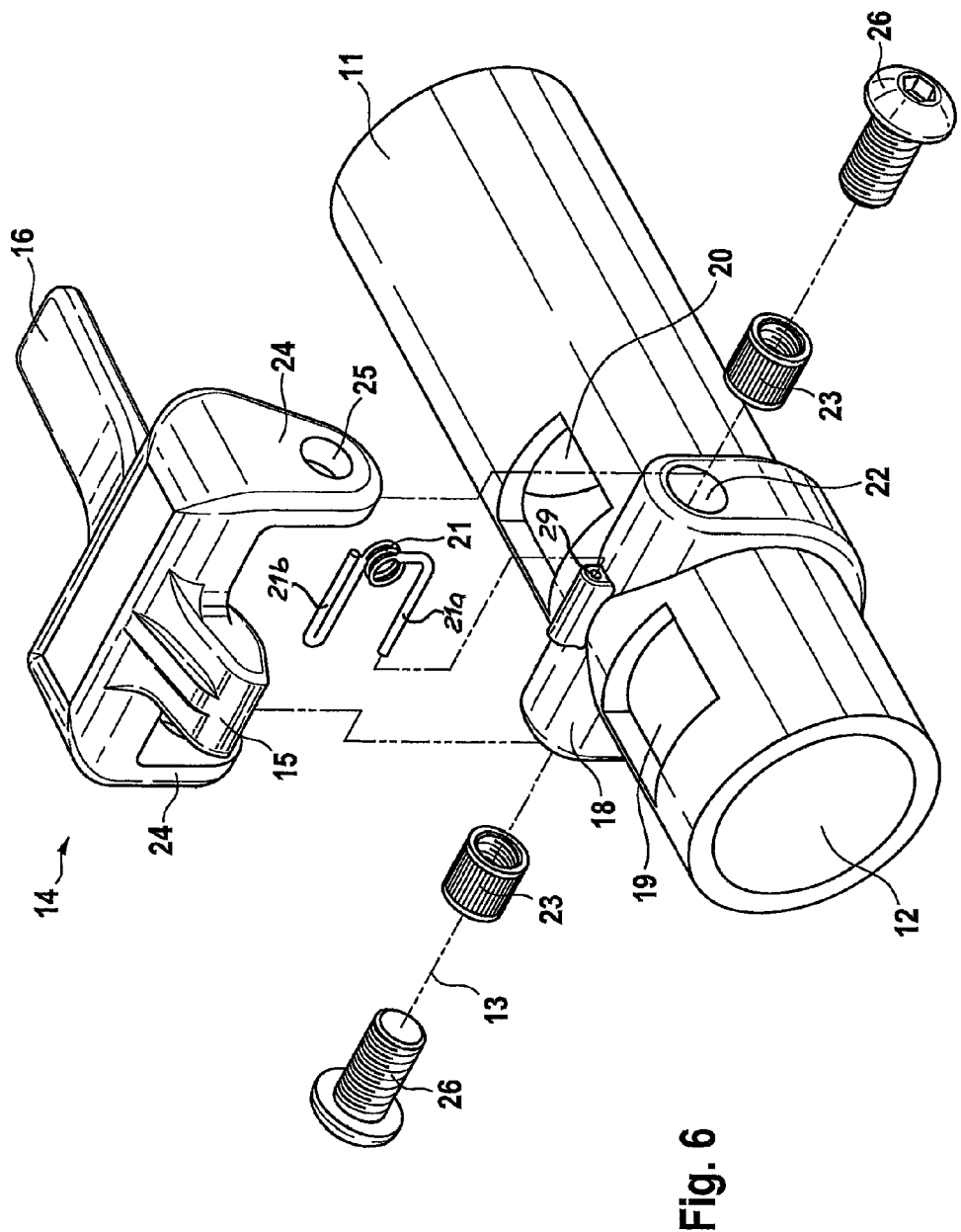
FIG. 6 is a perspective exploded view of the locking tube with the locking element according to FIG. 3.

As shown in FIG. 6, the over-center spring 21 is preferably a leg spring with a first leg 21a and a second leg 21b. Both legs 21a and 21b are connected to each other by a winding 21c. Due to the winding 21c, both legs 21a and 21b are spring-biased. Thus, one part of the leg spring acts as a locking spring and one part acts as an unlocking spring. Two separate springs can achieve the same result.

As can be further seen from FIG. 6, the first leg 21a is inserted into a bore 29 within bearing block 18. The second leg 21b is inserted into the locking element 14.

If the second leg 21b is located further away from cylinder 2 than bore 29 (FIG. 4) in the direction of the longitudinal extent of the gas spring 1, the locking arm 15 of locking element 14 will be pivoted by leg 21b towards the piston rod 8 or the peripheral surface of cylinder 2. In this case, the second leg 21b has the function of a locking spring.

If the second leg 21b is disposed exactly above the first leg 21a, the leg 21b is at the dead-center and does not exert any pivoting force onto the locking element 14.

If the second leg 21b, in the direction of the longitudinal extent of the gas spring 1, is located closer to the cylinder 2 then bore 29, the actuating arm 16 of the locking element 14 will be pivoted by leg 21b toward piston rod 8. In this case, the leg 21b has the function of an unlocking spring.

When the piston rod 8 is in its extended position and locking arm 15 is therefore pivoted by the second leg 21b into its locking position (FIGS. 1 and 7), the actuating arm 16 can be manually operated and pivoted into its unlocked position. In this case, the leg 21b moves from a position which, relative to bore 29 is closer to cylinder 2, through the dead-center into a position which is, relative to bore 29 further away from cylinder 2, and thereby executes a retaining function by keeping the locking element in the unlocked position.

When the piston rod 8 is pushed into the cylinder 2, the unlocking arm 17 will bear against the front face of cylinder 2 so that the locking element 14 will be pivoted to an extent so that the second leg 21b will again move through the dead-center point of the over-center spring. As a result, the locking arm 15 comes to rest onto the peripheral surface 27 of cylinder 2 under pretension due to the force of arm 21b of the over-center spring 21. With the next extension of piston rod 8, the locking arm 15 will initially glide along the peripheral surface 27 of cylinder 2 until the front face 28 is reached. Thereafter, locking arm 15 will be further pivoted due to the spring force of arm 21b toward the piston rod 8 into its locked position.

Thus, if the locking element 14 is located on the path between the dead center point and the unlocked position, it is moved into the unlocked position and held there by the retaining device, in this case an over-center spring 21.

If the locking element 14 is located on the path between the dead center point and the locked position, it is urged by force into the unlocked position by means of the over-center spring 21.

For the pivotable mounting of the locking element 14, the bearing block 18 comprises a bearing bore 22 extending transversely to the longitudinal extent of the locking tube 11, a bushing 23 with an internal thread being fixedly inserted in each case in the two end regions of said bearing bore.

The locking element 14 has approximately horseshoe-shaped bearing arms 24 extending transversely to the longitudinal extent of the locking tube 11 and which encompass the bearing block 18 such that pivot bores 25, formed coaxially with one another in the bearing arms 24, overlap the bearing bores 22 coaxially.

The locking element 14 is pivotably mounted on bearing pins 26 which correspond to the locking axis 13, which penetrate the pivot bores 25 and which are screwed into the bushings 23.

If the piston rod 8 is retracted, the locking arm 15 under the force of the over-center spring 21 bears against the peripheral surface 27 of the cylinder 2.

If the piston rod 8 is extended, the locking arm 15 slides on the peripheral surface 27 of the cylinder 2, until it reaches the end of the cylinder 2 on the piston rod side when the piston rod 8 is extended, and then pivots further into its locked position towards the piston rod 8 (FIGS. 1 and 7).

If the piston rod 8 is now loaded in the retraction direction, the locking arm 15 comes to bear against the front face 28 of the cylinder 2 and prevents the piston rod 8 from being retracted.

By manually urging the actuating arm 16 in the direction of the piston rod 8, the locking arm 15 is pivoted out of the inside of the locking tube 11 (FIGS. 4 and 8) so that the blocking is released and the piston rod 8 is able to retract into the cylinder 2.

As the over-center spring 21 now overruns its dead center point, it loads the locking element 14 in its unlocked position and secures it in this position.

An operator is now able to urge the piston rod 8 in the retraction direction, without having to hold the locking element 14 in its unlocked position as this is carried out by the over-center spring 21.

When pivoting the locking element 14 into its unlocked position, the unlocking arm 17 is simultaneously pivoted into the inside of the locking tube 11.

Again, if the piston rod 8 is retracted, the unlocking arm 17 comes to bear against the front face 28 of the cylinder 2, and the locking element 14 is, as a result, pivoted beyond the dead center point of the over-center spring 21 in the direction of the locked position, until the locking arm 15, now located in the region of the peripheral surface 27, comes to bear against the peripheral surface 27 and slides along said surface.

With the next extension of the piston rod 8, the locking element 14 is now ready to be pivoted back automatically into its locked position again.

The invention is not limited by the embodiments described above which are presented as examples only but can be modified in various ways within the scope of protection defined by the appended patent claims.

We claim:

1. A lockable gas spring arrangement comprising:
   a gas spring including a closed cylinder defining a cylinder interior filled with compressed gas, said cylinder having a front face and an external diameter;
   a displaceably guided piston within said cylinder interior subdividing said interior into a first and second chamber, said piston comprising a piston rod having a free end guided outward of said cylinder on said front face of said cylinder;
   a fastening tube defining an interior space and mounted to said free end of said piston rod, said fastening tube having an internal diameter larger than said external diameter of said cylinder and a length smaller than or the same as a maximum extension length of said piston rod;

a locking element arranged on said fastening tube and configured to be manually moved substantially radially to said piston between a locked position wherein said locking element is bearing against said front end face of said cylinder and an unlocked position permitting a free insertion movement of said piston into said cylinder; and a retaining device constructed for urging said locking element into said locked position and to have a retaining function for automatically retaining said locking element in said unlocked position, and wherein said locking element is constructed so as to shear off when said locking element is in the locked position and a specific bearing force on said front face of said cylinder on the piston rod side is exceeded; and wherein said locking element and piston rod are configured so that when said piston is pushed in and said locking element is located in and in contact with a radial region of said cylinder, said retaining function of said retaining element is released automatically.

2. The gas spring assembly of claim 1, additionally comprising a locking axis and wherein said locking element further comprises a locking arm pivotably mounted about said locking axis between said unlocked position extending approximately parallel to said piston rod and a locked position extending at an angle to said piston rod.

3. The gas spring arrangement of claim 1, wherein said locking element is of a dual-arm configuration comprising a locking arm and an actuating arm.

4. The gas spring arrangement of claim 3, wherein said actuating arm extends approximately opposite said locking arm.

5. The gas spring assembly of claim 1, wherein said locking element, when moved between a locked position and an unlocked position, defines a pivoting path with a dead center point;

said retaining device comprising an unlocking spring for urging said locking element into an unlocked position when said locking element is on the pivoting path between the dead center point and the unlocked position; and a locking spring for urging said locking element into a locked position when said locking element is on the pivoting path between the dead center point and the locked position.

6. The gas spring assembly of claim 5, wherein said unlocking spring and said locking spring are formed by an over-center spring.

7. The gas spring assembly of claim 1, wherein said retaining device comprises a spring for urging said locking device into an unlocked position.

8. The gas spring assembly of claim 7, wherein said retaining device comprises a leg spring having a first leg and a second leg and a winding connecting said first leg and said second leg, one of said legs urging said locking element into an unlocked position.

9. The gas spring assembly of claim 2, wherein said locking element additionally comprises an unlocking arm protruding in the unlocked position of said locking element approximately radially into said interior of said fastening tube towards said piston rod protruding out of said cylinder; said unlocking arm constructed to be pivoted away from said front face of said cylinder on the piston rod side out of said interior space of said fastening tube so as to be able to release said retaining function of said retaining device.

10. The gas spring assembly of claim 2, wherein said piston rod has a longitudinal extent and said locking axis extends radially outside said fastening tube transversely to said longitudinal extent of said piston rod.

11. The gas spring assembly of claim 2, wherein said fastening tube comprises an external diameter and an end facing said cylinder; and additionally comprising a locking tube coaxially attached to said fastening tube on said end facing said cylinder; said locking element mounted on said locking tube for pivoting movement about said locking axis.

12. The gas spring assembly of claim 9, wherein at least one of said locking tube and said locking element is a plastics injection-molded part.

13. The gas spring assembly of claim 3, additionally comprising a bearing block formed integrally with said locking tube; said locking axis extending through said bearing block.

14. The gas spring assembly of claim 9, wherein said locking tube comprises an end region remote from said cylinder and an internal diameter corresponding to said external diameter of said fastening tube, said locking tube being fixedly arranged on said end facing said cylinder.

15. The gas spring assembly of claim 12, wherein said locking tube is fixedly connected to the fastening tube by adhesive bonding.

16. The gas spring assembly of claim 12, wherein said locking tube is formed integrally with said fastening tube.

17. The gas spring assembly of claim 9, wherein one of said fastening tube and said locking tube has at least one radial through passage sized so as to permit one of said locking arm and said unlocking arm to extend into the interior of one of said fastening tube and said locking tube.

18. The gas spring assembly of claim 1, wherein said fastening tube has a length that can be altered.

* * * * *